July 2, 1957  J. S. MICHIE  2,797,587
KEYLESS RESILIENTLY-EXPANSIBLE V-PULLEY
Filed Sept. 4, 1953
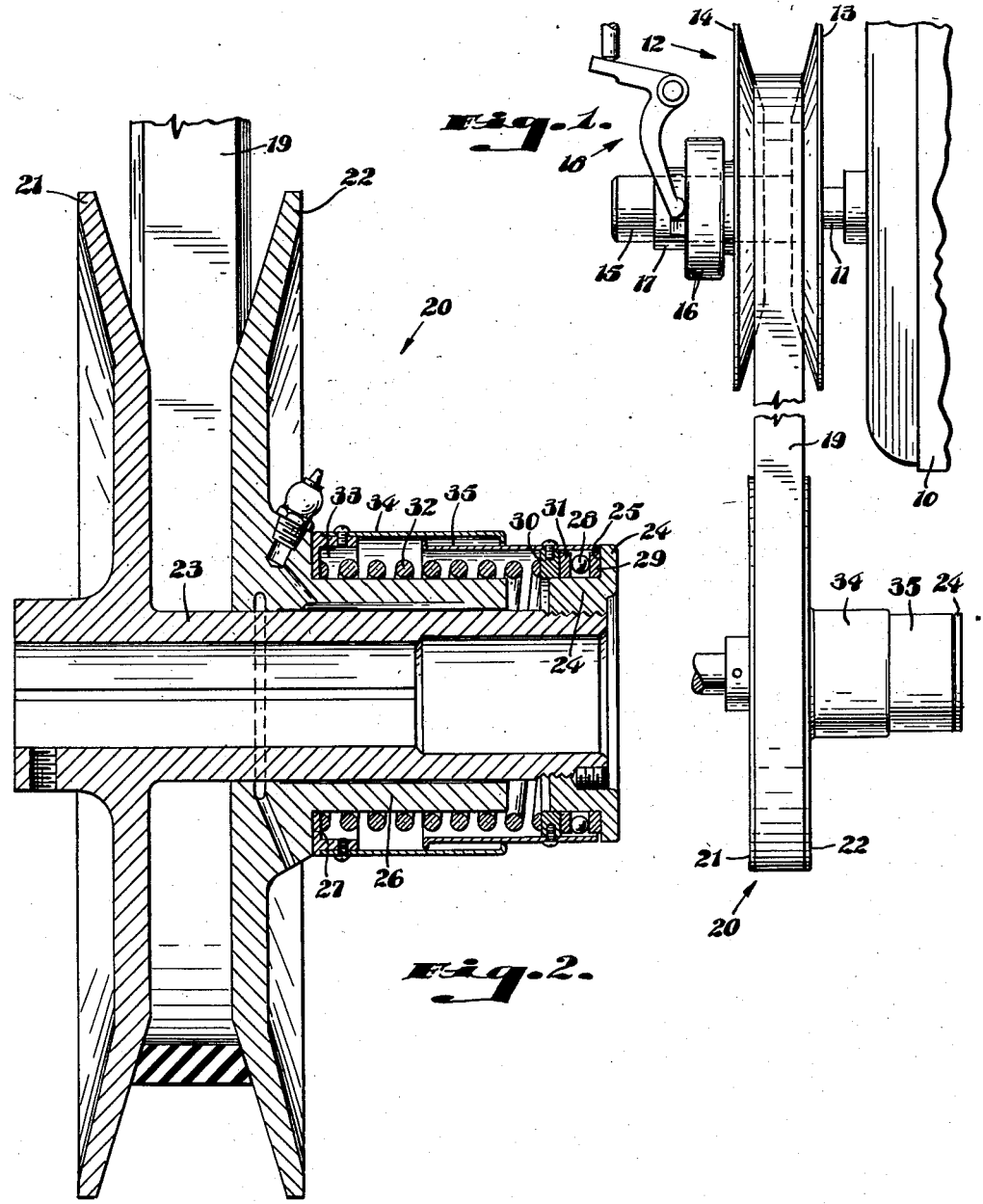
INVENTOR.
JOHN S. MICHIE,
BY:
ATTORNEY.

United States Patent Office 2,797,587
Patented July 2, 1957

2,797,587
KEYLESS RESILIENTLY-EXPANSIBLE V-PULLEY

John S. Michie, Columbus, Ind., assignor, by mesne assignments, to The Reliance Electric and Engineering Company, Cleveland, Ohio, a corporation of Ohio Application September 4, 1953, Serial No. 378,553

2 Claims. (Cl. 74—230.17)

The present invention relates to an expansible V-pulley for use in a variable speed transmission in which a pair of expansible V-pulleys are drivingly connected through an edge-active belt, the belt-engaging faces of one of said pulleys being manually adjustable toward and away from each other, and such faces of the other of said pulleys being resiliently urged toward each other.

It has been conventional practice to key the opposing disc faces of each pulley together to guard against relative rotation of such discs. Where such pulleys remain in one setting of adjustment for a long period of time, the lubricant between the disc hubs is squeezed out, so that the relatively movable disc portions "freeze," and subsequent shifting of the discs becomes difficult or impossible. I have found that if the discs of such a pulley are not keyed together, but are left free for relative rotation, on the order of from 2 to 30 R. P. M., this "freezing" will be effectively prevented without affecting the efficiency of the transmission.

The resiliently expansible pulley in such a transmission is conventionally formed of a pair of mating coned discs, one of the pair providing a hub upon which the other is axially slidable, and a coiled spring is confined between an abutment member on the outboard end of the hub and the movable disc to urge said disc toward its mate. So long as the discs are keyed against relative rotation, this construction works quite satisfactorily, but when the discs are left free for relative rotation, as stated above, the coiled spring will become twisted thereby seriously affecting its resiliency.

It is, therefore, the primary object of this invention to provide an expansible V-pulley of the type described, in which the disc portions are unkeyed for relative rotation and in which the coiled spring is so mounted that no twists will be imparted thereto upon such relative rotation.

Further objects of the invention will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a more or less diagrammatic illustration of a transmission in which my pulley structure is intended primarily for use; and Fig. 2 is a longitudinal sectional view, on an enlarged scale, showing the internal construction of my pulley.

Referring more particularly to the drawings, it will be seen that I have shown an electric motor 10, upon the shaft 11 of which is fixed an expansible V-pulley 12 comprising a pair of mating coned discs 13 and 14. Disc 13 has a central hub portion 15 on which disc 14 is journalled for rotation relative thereto and for axial adjustment toward and away from disc 13. An anti-friction bearing 16 is carried on the hub portion 17 of disc 14 and a bell crank adjustment member 18 engages bearing 16 whereby disc 14 can be shifted toward and away from disc 13. An edge-active belt 19 provides a driving connection between pulley 12 and a resiliently expansible pulley 20.

Pulley 20 comprises a pair of mating coned discs 21 and 22. Disc 21 has an axially projecting hub portion 23 upon which disc 22 is journalled for rotation relative to disc 21. An annulus 24 is fixed on the outer end of hub portion 23 and provides a shoulder 25 facing disc 21, disc 22 being confined between annulus 24 and disc 21. Shoulder 25 acts as an abutment for a purpose soon to become apparent.

Disc 22 preferably is provided with a sleeve or hub portion 26 surrounding hub portion 23, and a shoulder 27 facing shoulder 25. A thrust bearing 28 is sleeved on annulus 24 with one race 29 thereof bearing against shoulder 25. A ring member 30 bears against the other race 31, of bearing 28, and a coiled spring 32 is confined between said ring member and shoulder 27 to urge disc 22 resiliently toward disc 21.

Preferably, a cupped element 33 is interposed between the shoulder 27 and the adjacent end of spring 32 and supports a tubular shield member 34 projecting toward shoulder 25, said element constituting inturned flange means for said shield member 34.

A further tubular shield member 35 is supported from ring member 30 and projects toward shoulder 27 into telescopic association with member 34. This provides an enclosure for spring 32, and bearing 28; and it will be seen that ring member 30 constitutes inwardly-projecting flange means for the shield member 35.

Thus, it will be seen that even though there is relative rotation between discs 21 and 22, the provision of bearing 28 effectively prevents any twisting of the spring 32.

I claim as my invention:

1. A resiliently expansible V-pulley comprising a first coned disc and a second coned disc mounted for free coaxial rotation relative to said first disc and for independent axial reciprocation relative thereto, abutment means carried for rotation with said first disc, said second disc being located between said first disc and said abutment means, further abutment means carried for rotation with said second disc and facing said first abutment means, a thrust bearing having one race bearing against said first-named abutment means and its other race facing said further abutment means, a coiled spring confined between said further abutment means and the last-named race of said thrust bearing to urge said second coned disc resiliently toward said first coned disc, a ring member interposed between said last-named race of said thrust bearing and the adjacent end of said spring, a first tubular shield surrounding said coiled spring and supported on said ring member, and a second tubular shield supported on said second coned disc in telescopic association with said first tubular shield, the telescoped ends of said shields providing cooperating flange means limiting separation of said shields.

2. An expansible V-pulley comprising a first coned disc having a hub portion projecting axially therefrom, abutment means fixed at the outer end of said hub portion for rotation therewith, a second coned disc journalled on said hub portion for rotation and independent axial reciprocation relative thereto, said second disc being located between said first disc and said abutment means and providing abutment means facing said first-named abutment means, a first shield element having an inturned flange bearing against said second disc abutment means and projecting toward said first abutment means, a second shield element telescopically associated with said first shield element and projecting into substantial juxtaposition with said first-named abutment means, the telescoped ends of said shield elements being provided with cooperating means limiting separating relative axial movement thereof, inwardly-projecting flange means carried by said second shield means intermediate its ends and adjacent said first abutment means, a coiled spring sleeved about said hub portion, disposed within said shield elements, and confined between said flange means of said first and second shield elements, and an anti-friction bearing interposed between said first abutment means and said flange means of said second shield element.

References Cited in the file of this patent

UNITED STATES PATENTS

| | | |
|---|---|---|
| 818,047 | Power | Apr. 17, 1906 |
| 1,279,547 | Hueber | Sept. 24, 1918 |
| 2,287,326 | Reeves | June 23, 1942 |
| 2,298,535 | Krag | Oct. 13, 1942 |
| 2,478,289 | Lemon | Aug. 9, 1949 |

FOREIGN PATENTS

| | | |
|---|---|---|
| 20,797 | Great Britain | of 1912 |